United States Patent
Ishikawa et al.

(10) Patent No.: US 10,408,346 B2
(45) Date of Patent: Sep. 10, 2019

(54) PARKING LOCK APPARATUS

(71) Applicant: HONDA MOTOR CO., LTD., Tokyo (JP)

(72) Inventors: Yutaka Ishikawa, Wako (JP); Yuya Tachibanada, Wako (JP); Tetsuya Mochizuki, Wako (JP); Shunsuke Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 15/458,999

(22) Filed: Mar. 15, 2017

(65) Prior Publication Data

US 2017/0268673 A1 Sep. 21, 2017

(30) Foreign Application Priority Data

Mar. 15, 2016 (JP) .................................. 2016-050394

(51) Int. Cl.
 *F16H 61/00* (2006.01)
 *F16H 63/34* (2006.01)
 *B60T 13/16* (2006.01)
 *B60T 1/00* (2006.01)
 *B60T 13/20* (2006.01)
 *B60T 13/68* (2006.01)

(52) U.S. Cl.
 CPC .......... *F16H 63/3483* (2013.01); *B60T 1/005* (2013.01); *B60T 13/16* (2013.01); *B60T 13/20* (2013.01); *B60T 13/686* (2013.01); *F16H 63/3425* (2013.01); *F16H 61/0021* (2013.01); *F16H 61/0025* (2013.01)

(58) Field of Classification Search
 CPC ............. F16H 61/0021; F16H 61/0025; F16H 63/3416; F16H 63/3483; F16H 63/48; F16H 63/483; B60T 13/16; B60T 13/20
 See application file for complete search history.

(56) References Cited

U.S. PATENT DOCUMENTS

| 6,701,797 | B2 * | 3/2004 | Heuver | B60T 1/005 |
| | | | | 192/219.5 |
| 9,205,813 | B2 * | 12/2015 | Yokota | F16H 63/3416 |
| 9,624,990 | B2 * | 4/2017 | Ruehle | F16H 61/688 |
| 10,066,748 | B2 * | 9/2018 | Watanabe | F16H 63/3483 |
| 2002/0084149 | A1 * | 7/2002 | Heuver | B60T 1/005 |
| | | | | 188/69 |
| 2013/0306431 | A1 * | 11/2013 | Ruehle | F16H 61/688 |
| | | | | 192/219.4 |

(Continued)

FOREIGN PATENT DOCUMENTS

JP 2008-503695 2/2008

*Primary Examiner* — David R Morris
(74) *Attorney, Agent, or Firm* — Mori & Ward, LLP

(57) ABSTRACT

A parking lock apparatus includes an engaging mechanism, a slider, a hydraulic circuit, and a processor. The engaging mechanism is to prevent a rotation of a rotating body when the engaging mechanism is in a mechanical engagement state. The slider is to switch a state of the engaging mechanism between the mechanical engagement state and a mechanical disengagement state in accordance with a position of the slider. The hydraulic circuit is to change the position of the slider. The processor is configured to increase line pressure in the hydraulic circuit when the engaging mechanism is in the mechanical engagement state.

6 Claims, 5 Drawing Sheets

(56) References Cited

U.S. PATENT DOCUMENTS

| | | | | |
|---|---|---|---|---|
| 2014/0190784 A1* | 7/2014 | Yokota | ............... | F16H 63/3416 |
| | | | | 192/219.5 |
| 2015/0167832 A1* | 6/2015 | Van Druten | ........ | F16H 61/0021 |
| | | | | 137/565.15 |
| 2016/0341311 A1* | 11/2016 | Watanabe | ........... | F16H 63/3483 |
| 2017/0268672 A1* | 9/2017 | Mukai | .................... | B60T 1/005 |

* cited by examiner

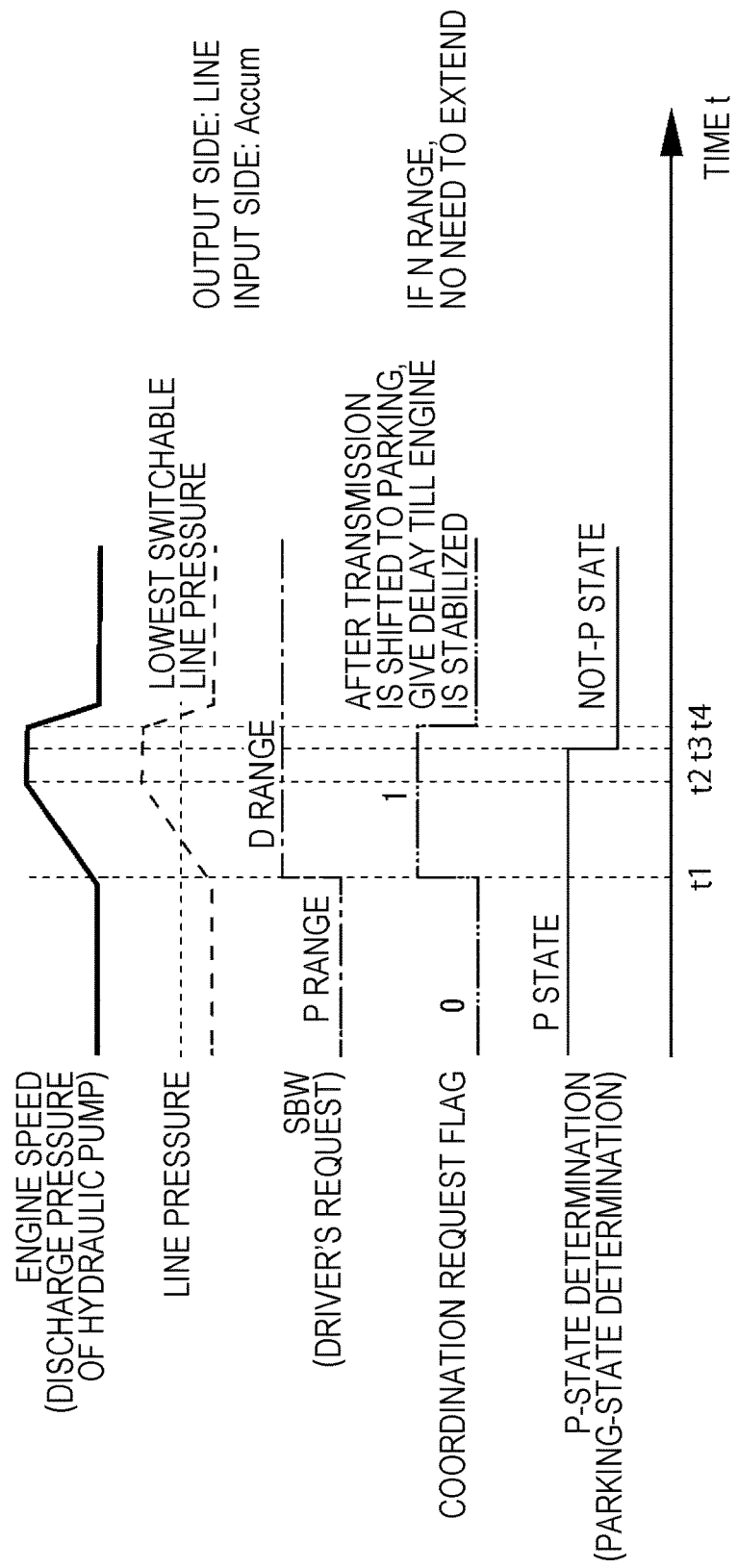

PARKING LOCK APPARATUS

CROSS-REFERENCE TO RELATED APPLICATIONS

The present application claims priority under 35 U.S.C. § 119 to Japanese Patent Application No. 2016-050394, filed Mar. 15, 2016, entitled "Parking Lock Apparatus." The contents of this application are incorporated herein by reference in their entirety.

BACKGROUND

1. Field

The present disclosure relates to a parking lock apparatus.

2. Description of the Related Art

There is a hitherto known parking lock apparatus that keeps a vehicle stopped by preventing the rotation of an output shaft of an automatic transmission thereof (see Japanese Unexamined Patent Application Publication (Translation of PCT Application) No. 2008-503695, for example). The parking lock apparatus is operated with a parking actuator valve that is activated by a hydraulic circuit.

SUMMARY

According to an aspect of the present disclosure, there is provided a parking lock apparatus including an engaging mechanism in which mechanical engagement prevents a rotating body from rotating; a slider that is capable of changing a state of the engaging mechanism between an engaged state and a disengaged state; a hydraulic circuit that changes a position of the slider; an oil pump that supplies operating oil to the hydraulic circuit; and a control unit that controls the hydraulic circuit. When the rotating body is prevented from rotating by enabling the engagement of the engaging mechanism, the control unit executes a line-pressure-increasing process that increases line pressure of the hydraulic circuit.

According to another aspect of the present disclosure, a parking lock apparatus includes an engaging mechanism, a slider, a hydraulic circuit, and a processor. The engaging mechanism is to prevent a rotation of a rotating body when the engaging mechanism is in a mechanical engagement state. The slider is to switch a state of the engaging mechanism between the mechanical engagement state and a mechanical disengagement state in accordance with a position of the slider. The hydraulic circuit is to change the position of the slider. The processor is configured to increase line pressure in the hydraulic circuit when the engaging mechanism is in the mechanical engagement state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a timing chart illustrating an operation performed by the parking lock apparatus according to the embodiment.

DESCRIPTION OF THE EMBODIMENTS

Figure 1:
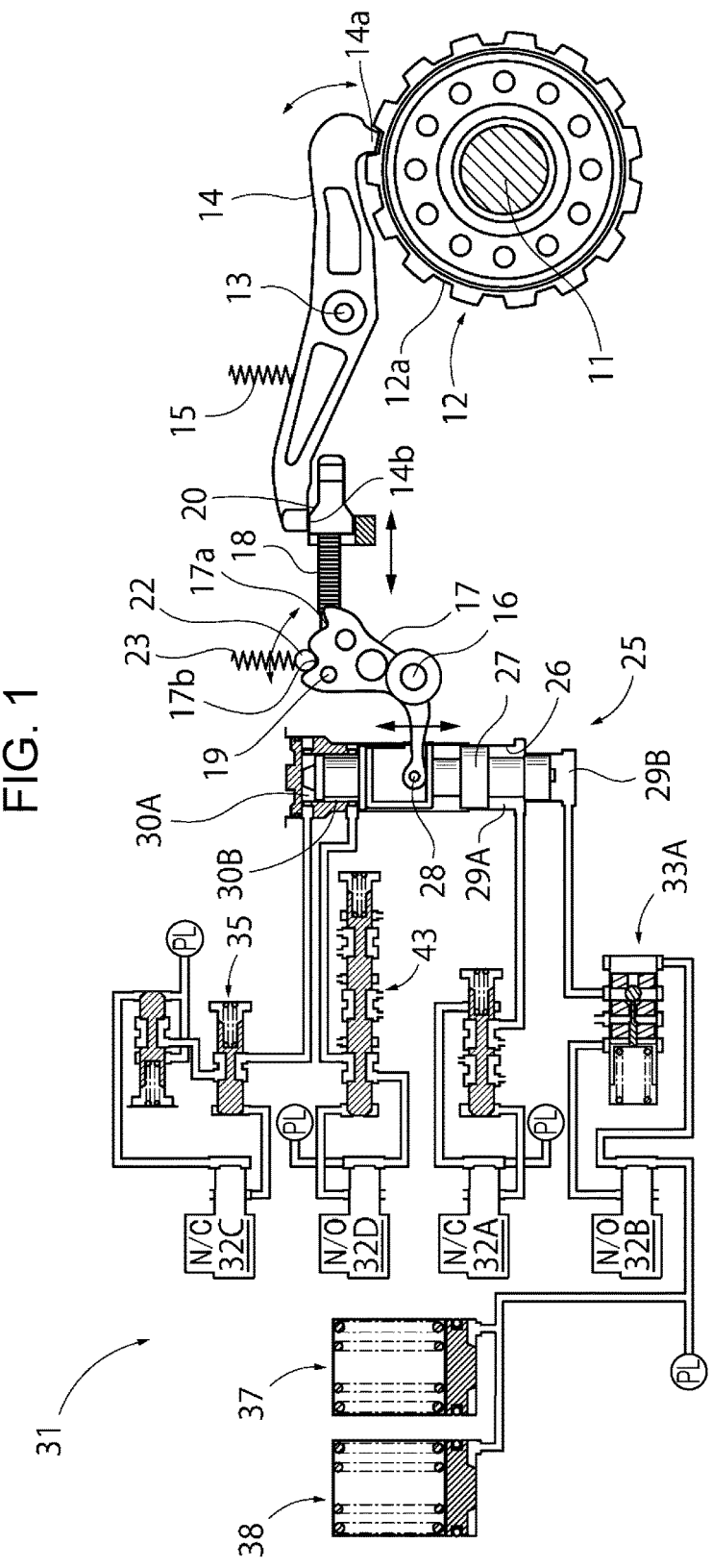
FIG. 1 illustrates a parking lock apparatus according to an embodiment of the present disclosure.

The embodiments will now be described with reference to the accompanying drawings, wherein like reference numerals designate corresponding or identical elements throughout the various drawings.

A parking lock apparatus according to an embodiment of the present disclosure will now be described with reference to FIGS. 1 to 5.

Referring to FIG. 1, the parking lock apparatus according to the present embodiment includes a parking gear 12 fixed to an output shaft 11 of an automatic transmission, and a parking pawl 14 pivoted by a spindle 13. The parking pawl 14 is provided at a first end thereof with a catch 14a.

Figure 2:
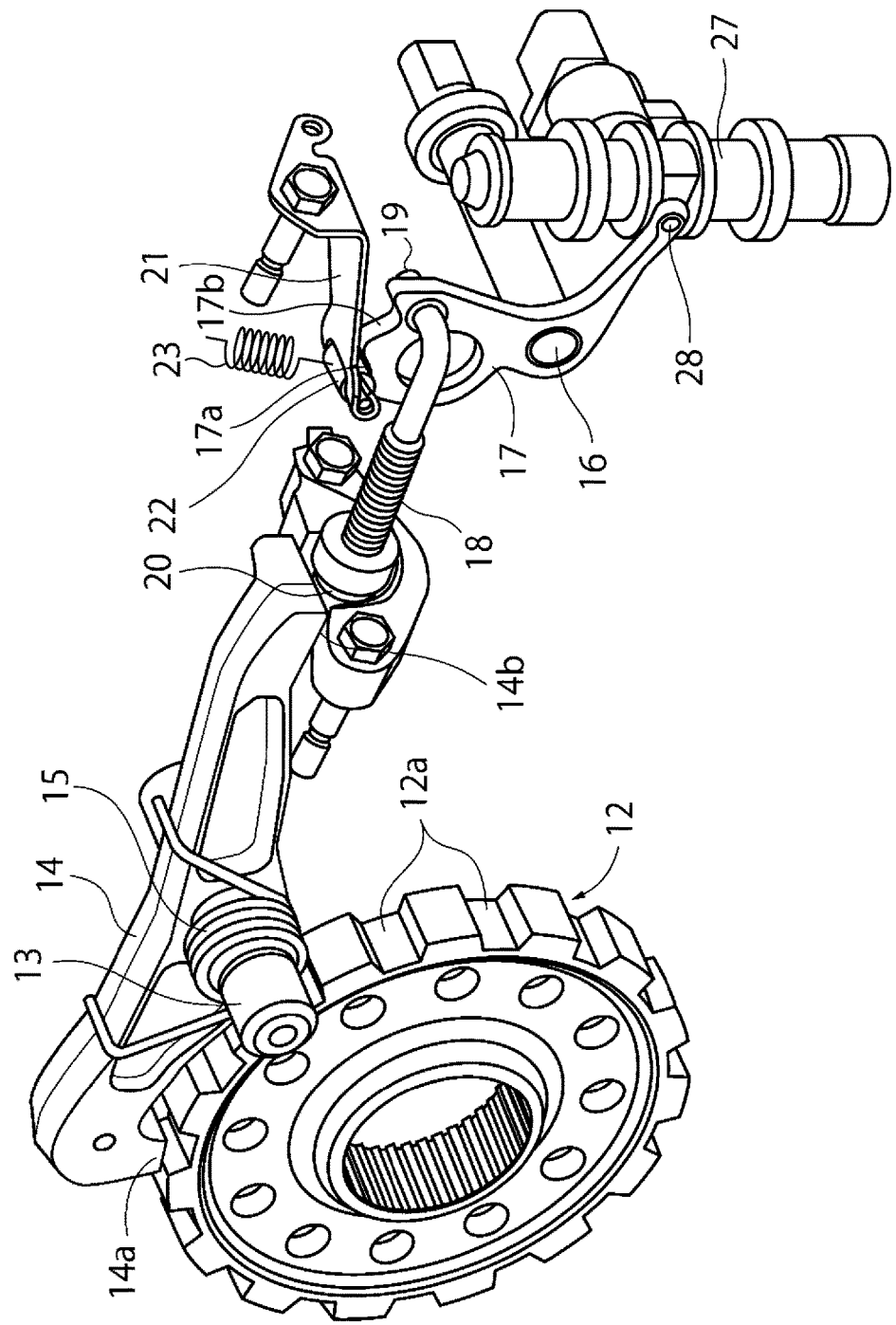
FIG. 2 illustrates an engaging mechanism according to the embodiment.

Referring to FIG. 2, the parking pawl 14 is urged by a spring 15 in such a direction that the catch 14a thereof goes out of a relevant one of tooth spaces 12a of the parking gear 12.

The parking lock apparatus further includes a detent plate 17 pivoted by a spindle 16, and a parking rod 18 pivoted at a first end thereof by a pin 19 fitted in the detent plate 17. The parking rod 18 is provided at a second end thereof with a conical cam 20. The parking pawl 14 is provided at a second end thereof with a cam follower 14b. The cam 20 is movably in contact with the cam follower 14b.

The detent plate 17 has two recesses 17a and 17b at a second end thereof. Either of the recesses 17a and 17b receives a detent roller 22 provided at a first end of a swingable arm 21. The detent roller 22 is urged by a spring 23 and thus engages with the recess 17a or 17b. A first end of the detent plate 17 is connected to a slider 27 with a pin 28.

The slider 27 is slidably fitted in a cylinder 26. A first locking oil chamber 29A and a second locking oil chamber 29B for moving the slider 27 in such a direction (upward) that parking lock is enabled are provided at the lower end of the cylinder 26. A first unlocking oil chamber 30A and a second unlocking oil chamber 30B for moving the slider 27 in such a direction (downward) that parking lock is disabled are provided at the upper end of the cylinder 26.

When oil pressure is applied to the first locking oil chamber 29A and to the second locking oil chamber 29B, the slider 27 moves upward. The movement of the slider 27 moves the cam 20 forward through intermediaries of the detent plate 17 and the parking rod 18, whereby the cam follower 14b of the parking pawl 14 is lifted up.

The parking pawl 14, with the cam follower 14b thereof lifted up by the cam 20, swings about the spindle 13 against the elastic force of the spring 15. Hence, the catch 14a engages with one of the tooth spaces 12a of the parking gear 12. Thus, parking lock is enabled, so that the vehicle is restrained from moving. When parking lock is enabled, the detent roller 22 engages with the recess 17b of the detent plate 17 and is kept in engagement therewith stably.

On the other hand, when oil pressure is applied to the first unlocking oil chamber 30A and to the second unlocking oil chamber 30B, the slider 27 moves downward. Then, the catch 14a of the parking pawl 14 moves away from the tooth space 12a of the parking gear 12. Thus, parking lock is disabled, allowing the vehicle to move. When parking lock is disabled, the detent roller 22 engages with the recess 17a of the detent plate 17 and is kept in engagement therewith stably.

Figure 3:
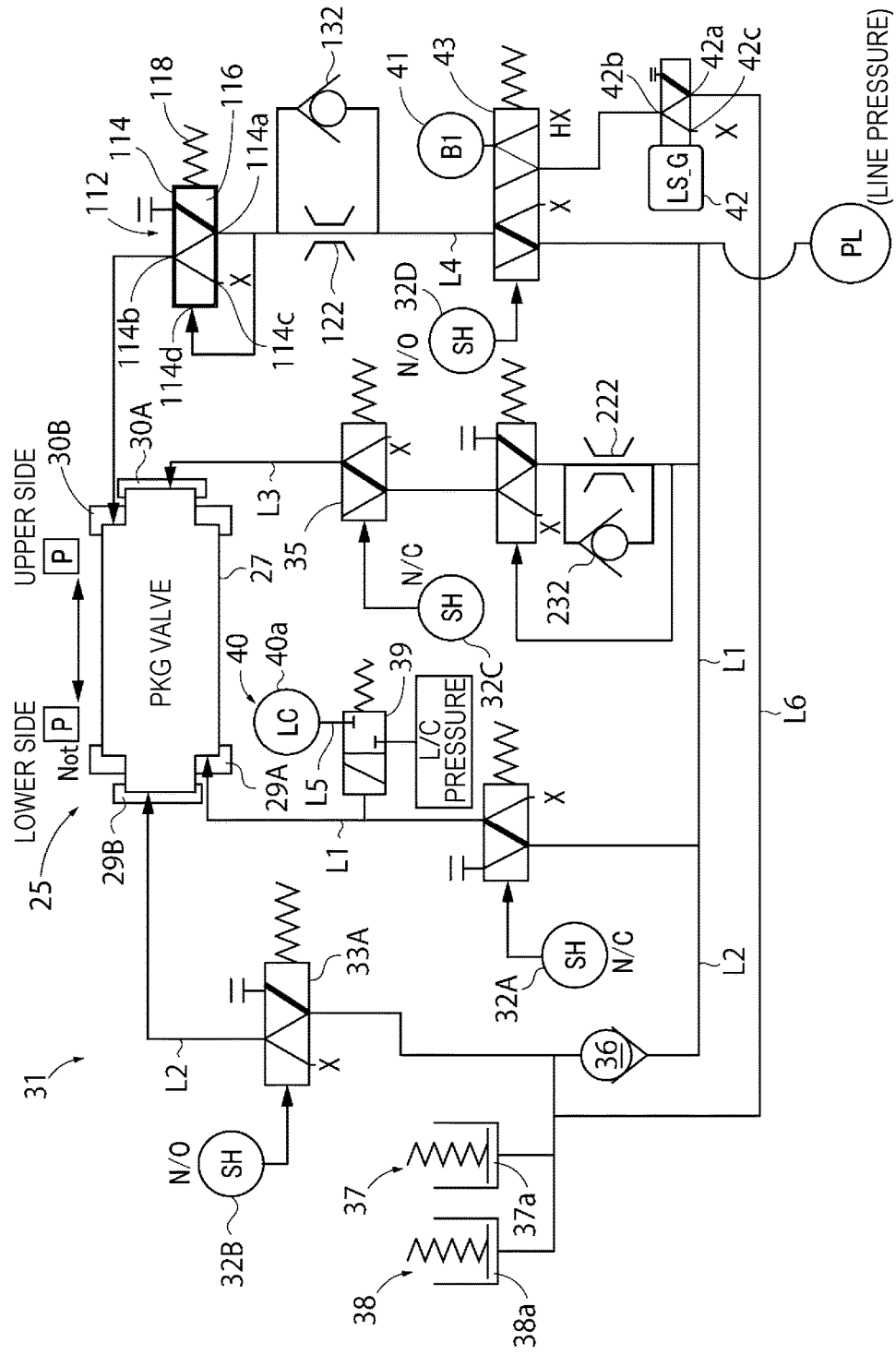
FIG. 3 illustrates a hydraulic circuit according to the embodiment.

Referring now to FIG. 3, a hydraulic circuit 31 that controls the operation of the slider 27 will be described.

The hydraulic circuit 31 includes an on/off solenoid valve 32A that applies line pressure, which is generated by a hydraulic pump (not illustrated) and is applied to an oil passage L1, to the first locking oil chamber 29A. The hydraulic circuit 31 further includes an on/off solenoid valve 32B that applies line pressure in an oil passage L2 to the second locking oil chamber 29B. The oil passage L2 is connected to a downstream point of the oil passage L1 and is provided with a check valve 36. The solenoid valve 32A directly applies the line pressure to the first locking oil chamber 29A when opened. The solenoid valve 32B opens a first ball valve 33A when opened. The solenoid valve 32A is normally closed, whereas the solenoid valve 32B is normally open.

The hydraulic circuit 31 further includes an on/off solenoid valve 32C that applies line pressure to the first unlocking oil chamber 30A through an oil passage L3, and an on/off solenoid valve 32D that applies line pressure in an oil passage L4 to the second unlocking oil chamber 30B. The oil passage L4 branches off at a point on the upstream side with respect to the check valve 36.

In the known art, the line pressure from the solenoid valve 32D is directly applied to the second unlocking oil chamber 30B. In the parking lock apparatus according to the present embodiment, the oil passage L4 (corresponding to the third oil passage according to the present disclosure) is provided with a hydraulic cut valve 112.

The hydraulic cut valve 112 includes a cylinder 114, a spool 116 slidably fitted in the cylinder 114, and a spring 118 that urges the spool 116 toward one side (the left side in FIG. 3) of the cylinder 114.

The cylinder 114 has, on the outer periphery thereof, an input port 114a to which the line pressure in the oil passage L4 is inputted, an output port 114b, and a drain port 114c. Furthermore, the cylinder 114 has a switching port 114d at a first end (the left end in FIG. 3) thereof. The switching port 114d is connected to a passage branching off from the oil passage L4. The line pressure is applied to the first end of the cylinder 114 through the switching port 114d.

In the hydraulic cut valve 112, when the line pressure is raised to a predetermined level at which the spool 116 is moved against the urging force of the spring 118, the input port 114a and the output port 114b communicate with each other with the movement of the spool 116, whereby the hydraulic cut valve 112 is opened. Accordingly, the line pressure is applied to the second unlocking oil chamber 30B. Conversely, when the line pressure is below the predetermined level, the output port 114b and the drain port 114c communicate with each other, whereby the oil pressure applied to the second unlocking oil chamber 30B is released through the drain port 114c.

According to the present embodiment, the spring 118 of the hydraulic cut valve 112 is set such that the hydraulic cut valve 112 is opened when the oil pressure is higher than or equal to the predetermined level. The predetermined level of oil pressure is determined by the difference in the rising edge, at the start of the hydraulic circuit 31 such as when the power of the vehicle is turned on, between the line pressure applied to the first locking oil chamber 29A at the lower end (corresponding to the second end according to the present disclosure) of the slider 27 through the oil passage L1 (corresponding to the fourth oil passage according to the present disclosure) and the line pressure applied to the second unlocking oil chamber 30B at the upper end (corresponding to the first end according to the present disclosure) of the slider 27 through the oil passage L4.

Hence, even if there is a difference between the rising edge of the line pressure in the oil passage L1 and the rising edge of the line pressure in the oil passage L4 at the start of the hydraulic circuit 31, the line pressure in the oil passage L4 is prevented from rising before the line pressure in the oil passage L1 rises. Such a configuration prevents a malfunction of the slider 27 that may be caused by the difference in the rising characteristic between the two line pressures: specifically, a misactivation of the slider 27 to a parking-lock-disabling position despite an instruction to move the slider 27 to a parking-lock-enabling position.

Thus, a quick response to the operation performed by the driver is realized with no waiting time for the slider 27 to return to the parking-lock-enabling position.

Furthermore, the oil passage L4 is provided, on the upstream side with respect to the hydraulic cut valve 112, with a first choke 122 where the oil passage L4 is narrowed. The first choke 122 is provided as a slot of a separating plate. Since the first choke 122 also serves as the slot of the separating plate, there is no need to provide an additional member serving as the first choke. Consequently, the number of components can be reduced, and the process of assembling the parking lock apparatus can be simplified.

The oil passage L4 is further provided with a first check valve 132 in parallel with the first choke 122. The first check valve 132 prevents the application of oil pressure to the second unlocking oil chamber 30B but allows the oil pressure in the second unlocking oil chamber 30B to be released through the hydraulic cut valve 112. Since the first check valve 132 is provided, the oil pressure can be released quickly.

When the solenoid valve 32C is opened, a spool of a parking-inhibiting valve 35 is moved to the right in FIG. 3 against the urging force of a spring, whereby the line pressure is applied to the first unlocking oil chamber 30A. Conversely, when the solenoid valve 32C is closed, the spool of the parking-inhibiting valve 35 is moved to the left in FIG. 3 by the urging force of the spring, whereby the line pressure applied to the first unlocking oil chamber 30A is drained. The solenoid valve 32C is normally closed. The solenoid valve 32D is normally open.

The oil passage L3 is provided, on the upstream side with respect to the parking-inhibiting valve 35, with a second choke 222 where the oil passage L3 is narrowed. The second choke 222 is provided as a slot of a separating plate. Since the second choke 222 also serves as the slot of the separating plate, there is no need to provide an additional member serving as the second choke. Consequently, the number of components can be reduced, and the process of assembling the parking lock apparatus can be simplified.

The oil passage L3 is further provided with a second check valve 232 in parallel with the second choke 222. The second check valve 232 prevents the application of oil pressure to the first unlocking oil chamber 30A but allows the oil pressure in the first unlocking oil chamber 30A to be released. Since the second check valve 232 is provided, the oil pressure can be released quickly.

An accumulating chamber 37a of a first accumulator 37 and an accumulating chamber 38a of a second accumulator 38 are connected to a point of the oil passage L2 between the check valve 36 and the solenoid valve 32B.

A lockup-clutch shift valve 39 is connected to a point of the oil passage L1 on the downstream side with respect to the solenoid valve 32A. Lockup-clutch pressure in an oil passage L5 is applied to a lockup clutch 40a of a torque converter 40, which is a starting mechanism, through the lockup-clutch shift valve 39.

An oil passage L6 is provided on the downstream side of the check valve 36 and is connected to a hydraulic brake 41, which is a hydraulically engageable device for gear shift. The oil passage L6 is provided with a linear solenoid valve 42 and a brake cut valve 43. The brake cut valve 43 is opened and closed by the solenoid valve 32D. The linear solenoid valve 42 has an input port 42a, an output port 42b, and a drain port 42c. The linear solenoid valve 42 adjusts the oil pressure inputted thereto from the input port 42a and outputs the adjusted oil pressure from the output port 42b or releases the oil pressure from the output port 42b via the drain port 42c.

Operations according to the embodiment of the present disclosure employing the above configuration will now be described.

When the driver has selected a drive (D) range or a reverse (R) range by operating a shifting portion such as a shift lever and the vehicle is traveling in a predetermined gear range, the line pressure generated by the hydraulic pump driven by an internal combustion engine is transmitted to the oil passage L1 and to the oil passage L3. The oil pressure in the oil passage L1 is transmitted through the check valve 36 to the oil passage L2 and to the oil passage L6, and is also transmitted to the oil passage L4. The line pressure transmitted to the oil passage L2 is transmitted to and is accumulated in the accumulating chamber 37a of the first accumulator 37 and in the accumulating chamber 38a of the second accumulator 38.

The solenoid valve 32C, which is normally closed, is opened with excitation when energized. The solenoid valve 32D, which is normally open, is opened when de-energized. When the solenoid valve 32C is opened, the spool of the parking-inhibiting valve 35 is moved to the right in FIG. 3. Accordingly, the line pressure in the oil passage L3 is transmitted through the parking-inhibiting valve 35 to the first unlocking oil chamber 30A, which is included in a hydraulic actuator 25. Furthermore, when the solenoid valve 32D is opened, the line pressure in the oil passage L4 is transmitted to the second unlocking oil chamber 30B.

The solenoid valve 32A, which is normally closed, is closed when de-energized. The solenoid valve 32B, which is normally open, is closed with excitation when energized. When the solenoid valve 32A is closed, the oil in the first locking oil chamber 29A of the hydraulic actuator 25 is drained through the solenoid valve 32A. On the other hand, when the solenoid valve 32B is closed, the first ball valve 33A is closed. Accordingly, the oil in the second locking oil chamber 29B is drained through the first ball valve 33A. Consequently, the slider 27 is moved to the left in FIG. 3, whereby parking lock is disabled.

The amount of oil that is allowed to flow through the solenoid valve 32B is relatively small, whereas the amount of oil that is allowed to flow through the first ball valve 33A that is opened and closed by the solenoid valve 32B is relatively large. That is, the provision of the first ball valve 33A increases the responsiveness of the slider 27.

As described above, while the vehicle is traveling, the solenoid valve 32A and the solenoid valve 32B are closed whereas the solenoid valve 32C and the solenoid valve 32D are open. Thus, the slider 27 is retained at the parking-lock-disabling position, so that parking lock is disabled.

The parking lock apparatus includes two locking oil chambers: namely, the first locking oil chamber 29A and the second locking oil chamber 29B; and two unlocking oil chambers: namely, the first unlocking oil chamber 30A and the second unlocking oil chamber 30B. Therefore, even if one of the solenoid valve 32C and the solenoid valve 32D is stuck in the closed state and the application of oil pressure to the first unlocking oil chamber 30A or the second unlocking oil chamber 30B is accidentally stopped, or even if one of the solenoid valve 32A and the solenoid valve 32B is stuck in the open state and oil pressure is accidentally applied to the first locking oil chamber 29A or the second locking oil chamber 29B, the hydraulic actuator 25 can operate at the parking-lock-disabling position without problems, providing satisfactory redundancy.

The solenoid valve 32C is opened in a first predetermined gear range. The solenoid valve 32D is opened in a second predetermined gear range. The first predetermined gear range and the second predetermined gear range partially overlap each other. Hence, in accordance with the gear range established at the time of interest, the following cases are expected to occur: a case where the line pressure is applied only to the first unlocking oil chamber 30A, a case where the line pressure is applied only to the second unlocking oil chamber 30B, and a case where the line pressure is applied to both the first unlocking oil chamber 30A and the second unlocking oil chamber 30B. In any of the three cases, there is no problem because the slider 27 is moved to the left in FIG. 3 and parking lock is disabled. In the overlapping part between the first and second gear ranges, the line pressure is applied to both the first unlocking oil chamber 30A and the second unlocking oil chamber 30B. Therefore, even if the solenoid valve 32C or the solenoid valve 32D has a failure and the application of the line pressure is stopped, parking lock is kept disabled, providing increased redundancy.

If the shifting portion such as a shift lever is moved to a parking (P) range and the vehicle is thus stopped while the internal combustion engine is in operation, the solenoid valve 32A and the solenoid valve 32B are opened whereas the solenoid valve 32C and the solenoid valve 32D are closed. Since the solenoid valve 32A is opened, the line pressure in the oil passage L1 is transmitted to the first locking oil chamber 29A of the hydraulic actuator 25. Furthermore, since the solenoid valve 32B is opened, the first ball valve 33A is opened, whereby the line pressure in the oil passage L2 is transmitted to the second locking oil chamber 29B of the hydraulic actuator 25.

Meanwhile, since the solenoid valve 32C is closed, the operating oil in the first unlocking oil chamber 30A of the hydraulic actuator 25 is drained through the parking-inhibiting valve 35. Furthermore, since the solenoid valve 32D is closed, the operating oil in the second unlocking oil chamber 30B of the hydraulic actuator 25 is drained through the solenoid valve 32D. Consequently, the slider 27 moves to the right in FIG. 3, whereby parking lock is enabled.

As described above, if the P range is selected with the shifting portion while the internal combustion engine is in operation, the solenoid valve 32A and the solenoid valve 32B are opened whereas the solenoid valve 32C and the solenoid valve 32D are closed. Thus, the slider 27 can be moved to the parking-lock-enabling position. The parking lock apparatus includes two locking oil chambers: namely, the first locking oil chamber 29A and the second locking oil chamber 29B; and two unlocking oil chambers: namely, the first unlocking oil chamber 30A and the second unlocking oil chamber 30B. Therefore, even if one of the solenoid valve 32C and the solenoid valve 32D is stuck in the open state and oil pressure is accidentally applied to the first unlocking oil chamber 30A or the second unlocking oil chamber 30B, or even if one of the solenoid valve 32A and the solenoid valve 32B is stuck in the closed state and the application of oil pressure to the first locking oil chamber 29A or the second locking oil chamber 29B is accidentally stopped, the hydraulic actuator 25 can operate at the parking-lock-enabling position without problems, providing satisfactory redundancy.

When the ignition (the power of the vehicle) is turned off by operating the shifting portion to the P range, the internal combustion engine stops, whereby the line pressure from the pump that is driven by the internal combustion engine is removed. Nevertheless, according to the embodiment, the oil pressure accumulated in the first accumulator 37 and in the second accumulator 38 can activate the parking lock apparatus without problems.

Furthermore, since the solenoid valve 32B is opened, the oil pressure in the first accumulator 37 and in the second accumulator 38 is transmitted to the second locking oil chamber 29B. Meanwhile, since the solenoid valve 32C is closed, the operating oil in the first unlocking oil chamber 30A is drained through the parking-inhibiting valve 35. Furthermore, since the solenoid valve 32D is closed, the operating oil in the second unlocking oil chamber 30B is drained through the solenoid valve 32D. Consequently, the slider 27 moves to the right in FIG. 3, whereby parking lock is enabled.

Thus, even if the ignition is turned off by selecting the P range with the shifting portion and the line pressure is thus removed, the oil pressure accumulated in the first accumulator 37 and in the second accumulator 38 can activate the parking lock apparatus without problems.

The vehicle according to the embodiment has a function of idling-stop control. Specifically, when the vehicle temporarily stops at the stoplight or the like, the internal combustion engine stops. Accordingly, the pump stops, whereby the line pressure is removed. Since the line pressure is removed, the oil pressure in the first unlocking oil chamber 30A and the oil pressure in the second unlocking oil chamber 30B are also removed. However, since the detent plate 17 and the detent roller 22 are in engagement with each other, parking lock is kept disabled.

When the internal combustion engine is restarted at the recovery from the idling-stop state, the line pressure does not rise quickly. Therefore, the quick start of the vehicle may be hindered because oil pressure might not be applied quickly to the hydraulic brake 41, which is a hydraulically engageable device that is necessary for starting the vehicle. However, in the parking lock apparatus according to the embodiment, the oil pressure retained in the first accumulator 37 and in the second accumulator 38 in the idling-stop state allows the hydraulic brake 41 to activate without delay.

To be more specific, simultaneously with the recovery from the idling-stop state, the oil pressure accumulated in the first accumulator 37 and in the second accumulator 38 is applied to the oil passage L2 and to the oil passage L6. At this point of time, the solenoid valve 32D provided to the oil passage L4 is open because the power supply is being stopped. Accordingly, the spool of the brake cut valve 43 is positioned on the left side in FIG. 3. Hence, if the linear solenoid valve 42 provided to the oil passage L6 is opened to a predetermined degree of opening, the oil pressure accumulated in the first accumulator 37 and in the second accumulator 38 can be applied to the hydraulic brake 41, whereby the vehicle can be started quickly.

While the operation of the hydraulic brake 41 at the recovery from the idling-stop state has been described above, the hydraulic brake 41 is also controllable by activating the brake cut valve 43 with the solenoid valve 32D while the vehicle is normally travelling. If the solenoid valve 32D is closed so that the spool of the brake cut valve 43 is moved to the left in FIG. 3 and the linear solenoid valve 42 and the hydraulic brake 41 are thus isolated from each other, the application of oil pressure to the second unlocking oil chamber 30B is stopped. However, the oil pressure is still applied to the first unlocking oil chamber 30A. Hence, the slider 27 is retained at the parking-lock-disabling position, and there is no chance that parking lock is enabled.

The solenoid valve 32A according to the embodiment is also used for activating the lockup clutch 40a of the torque converter 40. Specifically, the solenoid valve 32A operates as follows. While the vehicle is travelling, the solenoid valve 32A is closed and the spool of the lockup-clutch shift valve 39 is therefore positioned on the right side in FIG. 3. Accordingly, lockup-clutch pressure is applied to the lockup clutch 40a of the torque converter 40. If the solenoid valve 32A is opened in this state, the spool of the lockup-clutch shift valve 39 moves to the right in FIG. 3 and the oil pressure in the lockup clutch 40a is drained, whereby the lockup clutch 40a is disengaged.

If the solenoid valve 32A is opened, the line pressure is applied to the first locking oil chamber 29A. However, in the above state, since the line pressure is already applied to both the first unlocking oil chamber 30A and the second unlocking oil chamber 30B, there is no chance that the slider 27 moves to the parking-lock-enabling position even if the line pressure is applied to the first locking oil chamber 29A. Hence, there is no chance that parking lock is enabled.

To summarize, in the parking lock apparatus according to the embodiment, the solenoid valve 32A and the solenoid valve 32D that control the operation of the slider 27 are also used for controlling the lockup clutch 40a of the torque converter 40 and for controlling the hydraulic brake 41, respectively. Therefore, the number of solenoid valves can be reduced, and the configuration of the hydraulic circuit 31 can thus be simplified. Moreover, since the first accumulator 37 and the second accumulator 38 are used not only for enabling parking lock but also for activating the hydraulic brake 41, which is a hydraulically engageable device, at the time of recovery from the idling-stop state, the number of accumulators can be reduced, which further simplifies the configuration of the hydraulic circuit 31.

Figure 4:
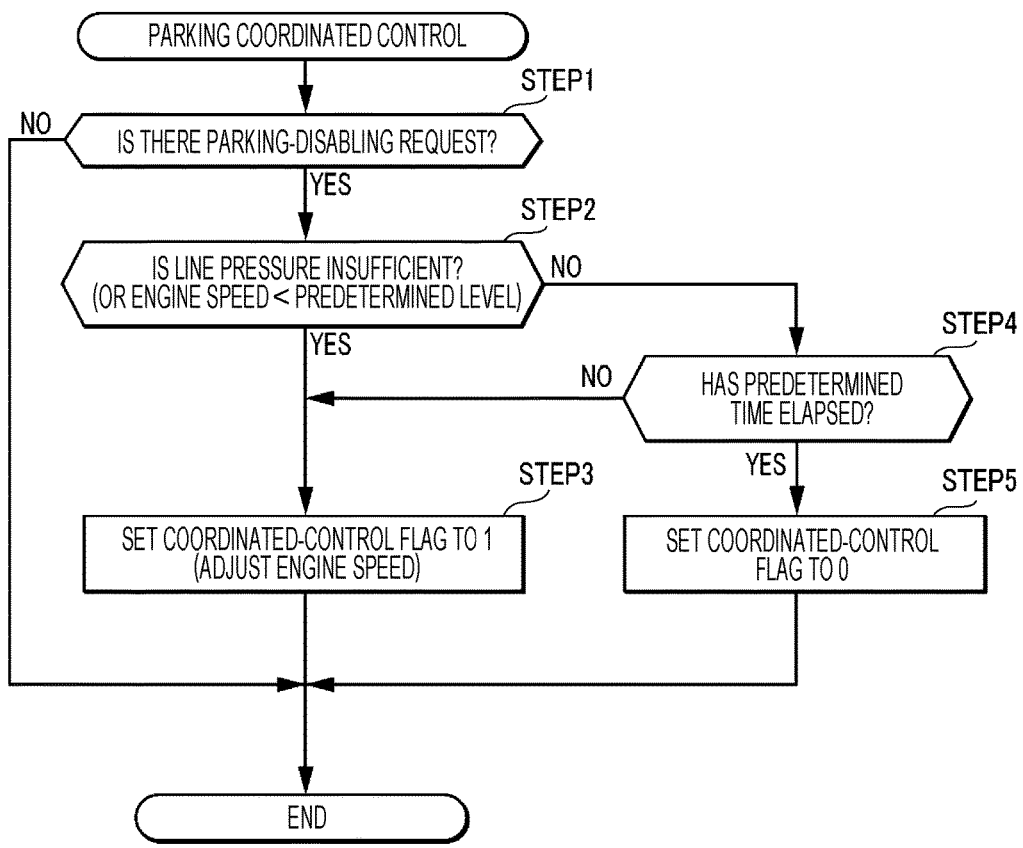
FIG. 4 is a flow chart illustrating a process performed by a control unit of the parking lock apparatus according to the embodiment.

FIG. 4 is a flow chart illustrating a line-pressure-increasing process performed by an electronic control unit ECU included in the parking lock apparatus according to the present embodiment. The electronic control unit ECU includes a central processing unit (CPU), a memory, and so forth. The electronic control unit ECU controls the hydraulic circuit 31 by causing the CPU to execute controls programs stored in a storage unit such as the memory. The flow chart illustrated in FIG. 4 is based on a situation where the vehicle is stopped. While the vehicle is stopped, the electronic control unit ECU executes the line-pressure-increasing process illustrated in FIG. 4 in a predetermined control cycle (a cycle of 10 ms, for example).

The line-pressure-increasing process starts with STEP 1, in which it is checked whether or not a signal requesting the disabling of parking lock (hereinafter referred to as the parking-disabling request) that is issued with the operation of the shifting portion, such as a shift lever or an axel pedal, is received. If the parking-disabling request is not received, the process ends here.

If the parking-disabling request is received in STEP 1, the process proceeds to STEP 2, in which it is checked whether or not the line pressure is insufficient. In the present embodiment, whether or not the line pressure is insufficient is determined by checking whether or not the speed of the internal combustion engine is below a predetermined level. However, the way of determination of whether or not the line pressure is insufficient according to the present disclosure is not limited to the above. For example, whether or not the line pressure is insufficient may be determined by directly detecting the oil pressure of the hydraulic circuit 31.

If it is determined that the line pressure is insufficient in STEP 2, the process proceeds to STEP 3, in which a coordinated-control flag is set to 1, and the process ends here. The coordinated-control flag is a flag for controlling the internal combustion engine. When the coordinated-control flag is set to 1, the control unit controls the speed of the internal combustion engine to be higher than or equal to the predetermined level. When the coordinated-control flag is 0, the control unit controls the internal combustion engine as usual.

In STEP 2, if the line pressure is not insufficient, that is, if the speed of the internal combustion engine is higher than or equal to the predetermined level, the process proceeds to STEP 4, in which it is checked whether or not a predetermined time period has elapsed from when it has been determined that the line pressure is not insufficient. The predetermined time period is set on the basis of a time period required for the process of disengaging the parking pawl 14 from the parking gear 12 while a satisfactory level of line pressure is being supplied to the hydraulic circuit 31. The parking pawl 14 and the parking gear 12 together form an engaging mechanism. The predetermined time period may be measured from either time t1 or time t2 indicated in the time chart illustrated in FIG. 5 to be referred to below. If the time period is measured from time t1, a time period required for the speed of the internal combustion engine to increase is taken into consideration.

If the predetermined time period has not elapsed in STEP 4, the process proceeds to STEP 3, in which the coordinated-control flag is set to 1, and the process ends here. If the predetermined time period has elapsed in STEP 4, the process proceeds to STEP 5, in which the coordinated-control flag is set to 0, and the process ends here.

FIG. 5 is a timing chart illustrating the operation of the parking lock apparatus according to the present embodiment. As illustrated in FIG. 5, at time t1, the gear range is changed from the parking range to the drive range by the driver's shifting operation, and the electronic control unit ECU receives the parking-disabling request. However, the speed of the internal combustion engine is still insufficient at time t1 with the line pressure (represented by a dashed line) not reaching the lowest switchable level (represented by a dotted line) at or over which parking lock can be disabled. Hence, in accordance with the process illustrated in FIG. 4, the coordinated-control flag is set to 1 at time t1 as illustrated in FIG. 5, whereby the speed of the internal combustion engine is increased.

When the speed of the internal combustion engine has reached the predetermined level at time t2, the electronic control unit ECU controls the speed of the internal combustion engine to be maintained at that level.

Then, the parking pawl 14 is disengaged from the parking gear 12 at time t3, whereby parking lock is disabled. Thus, the gear range is shifted to the drive range. At time t4, since the predetermined time period has elapsed from time t1 or time t2, the coordinated-control flag is set to 0. Thus, the line-pressure-increasing process ends.

In the parking lock apparatus according to the present embodiment, to cause the catch 14a of the parking pawl 14 to engage with the tooth space 12a of the parking gear 12 (the parking pawl 14 and the parking gear 12 together form an engaging mechanism), the line pressure of the hydraulic circuit 31 is increased. Hence, there is no need to employ an oil pump having a relatively large capacity. Consequently, the rotational resistance generated by the oil pump can be reduced.

While an embodiment of the present disclosure has been described above, various design changes can be made to the present disclosure without departing from the essence thereof.

For example, the number of openable-and-closable valves (second solenoid valves and third solenoid valves) according to the present disclosure is not limited to two, such as the solenoid valve 32A and the solenoid valve 32B employed in the above embodiment, and may be one or three or more.

Furthermore, the number of unlocking solenoid valves (first solenoid valves) is not limited to two, such as the solenoid valve 32C and the solenoid valve 32D employed in the above embodiment, and may be one or three or more.

While the solenoid valve 32A according to the above embodiment also serves as a solenoid valve that applies oil pressure to the lockup clutch 40a of the torque converter 40, the solenoid valve 32B may serve as that solenoid valve. Alternatively, the solenoid valve 32A (or the solenoid valve 32B) may also serve as a solenoid valve that applies oil pressure to the hydraulic brake 41. That is, the solenoid valve 32A or the solenoid valve 32B may also serve as a solenoid valve that applies oil pressure to the starting mechanism or a solenoid valve that applies oil pressure to any of a plurality of hydraulically engageable devices.

Moreover, the hydraulically engageable device is not limited to the hydraulic brake 41 employed in the above embodiment and may be another device such as a hydraulic clutch.

Furthermore, the starting mechanism is not limited to the torque converter 40 employed in the above embodiment and may be another mechanism such as a starting clutch.

Furthermore, while the oil pump according to the above embodiment is activated with the rotation of the internal combustion engine, the oil pump according to the present disclosure is not limited thereto. For example, the oil pump may be activated with electrical power. In that case, however, the line pressure is increased by increasing the power supplied to the oil pump.

According to an aspect of the present disclosure, there is provided a parking lock apparatus including an engaging mechanism (for example, the parking gear 12 and the parking pawl 14 according to the embodiment, which applies throughout the following) in which mechanical engagement prevents a rotating body (for example, the output shaft 11 according to the embodiment, which applies throughout the following) from rotating; a slider (for example, the slider 27 according to the embodiment, which applies throughout the following) that is capable of changing a state of the engaging mechanism between an engaged state (an engagement state) and a disengaged state (a disengagement state); a hydraulic circuit (for example, the hydraulic circuit 31 according to the embodiment, which applies throughout the following) that changes a position of the slider; an oil pump (for example, the oil pump according to the embodiment, which applies throughout the following) that supplies operating oil to the hydraulic circuit; and a control unit (for example, the electronic control unit ECU according to the embodiment, which applies throughout the following) that controls the hydraulic circuit. When the rotating body is prevented from rotating by enabling the engagement of the engaging mechanism, the control unit executes a line-pressure-increasing process that increases line pressure of the hydraulic circuit.

According to the above aspect of the present disclosure, there is no need to employ an oil pump having a relatively large capacity. Consequently, the rotational resistance generated by the oil pump can be reduced.

In the above aspect of the present disclosure, it is preferable that the oil pump discharge the operating oil by utilizing a rotation of a prime mover (for example, the internal combustion engine according to the embodiment, which applies throughout the following) and that, in the line-pressure-increasing process, the line pressure be increased by increasing a speed of rotation of the prime mover.

Obviously, numerous modifications and variations of the present invention are possible in light of the above teachings. It is therefore to be understood that within the scope of the appended claims, the invention may be practiced otherwise than as specifically described herein.

What is claimed is:

1. A parking lock apparatus comprising:
    an engaging mechanism in which mechanical engagement prevents a rotating body from rotating;
    a slider that is capable of changing a state of the engaging mechanism between an engaged state and a disengaged state;
    a hydraulic circuit that changes a position of the slider;
    an oil pump that supplies operating oil to the hydraulic circuit;
    an internal combustion engine to drive the oil pump; and
    a control unit that controls the hydraulic circuit,
    wherein the hydraulic circuit comprises:
        a first switching valve to apply oil pressure to the slider to move the slider to the parking release position;
        a second switching valve to apply oil pressure to the slider to move the slider to the parking lock position;
        a first oil passage connecting the first switching valve and the slider and extending to a first chamber of an actuator in which the slider is disposed;
        a second oil passage connecting the second switching valve and the slider and extending to a second chamber of the actuator;
        a third oil passage which is connected to the slider and through which a first line pressure is applied to push the slider toward the parking release position, the third oil passage extending to a third chamber of the actuator;
        a fourth oil passage which is connected to the slider and through which a second line pressure is applied to push the slider toward the parking lock direction, the fourth oil passage extending to a fourth chamber of the actuator;
        a common oil passage connected to the first oil passage, the second oil passage, the third oil passage, and the fourth oil passage, a line pressure being applied to the common oil passage to apply the first pressure to the third oil passage and to apply the second line pressure to the fourth oil passage; and
        a hydraulic cut valve provided in the third oil passage configured to be opened when the first line pressure is higher than or equal to a difference threshold that is determined based on a pressure difference between a first rising pressure and a second rising pressure, the first rising pressure being the first line pressure rising when applying the line pressure to the common oil passage is started, the second rising pressure being the second line pressure rising when applying the line pressure to the common oil passage is started, the hydraulic cut valve being configured to communicate the third oil chamber to a drain passage when the first line pressure is below the difference threshold,
    wherein the control unit determines whether the line pressure reaches a pressure threshold, a state of the engaging mechanism being changeable from the engaged state to the disengaged state when the line pressure is more than or equal to the pressure threshold,
    wherein, when the control unit determines the line pressure does not reach the pressure threshold, the control unit controls the internal combustion engine to increase the speed of rotation of the internal combustion engine to execute a line-pressure-increasing process that increases the line pressure such that the line pressure reaches the pressure threshold.

2. The parking lock apparatus according to claim 1, wherein the oil pump discharges the operating oil by utilizing a rotation of the internal combustion engine.

3. The parking lock apparatus according to claim 1, wherein the control unit determines whether the line pressure reaches the pressure threshold based on whether a speed of rotation of the internal combustion engine reaches a speed threshold.

4. A parking lock apparatus comprising:
    an engaging mechanism to prevent a rotation of a rotating body when the engaging mechanism is in a mechanical engagement state;
    a slider to switch a state of the engaging mechanism between the mechanical engagement state and a mechanical disengagement state in accordance with a position of the slider;
    a hydraulic circuit to change the position of the slider;
    an oil pump to supply operating oil to the hydraulic circuit;
    an internal combustion engine to drive the oil pump; and
    a processor configured to determine whether a line pressure of the hydraulic circuit reaches a pressure threshold, the state of the engaging mechanism being changeable from the mechanical engagement state to the mechanical disengagement state when the line pressure is more than or equal to the pressure threshold,
    wherein, when the processor determines the line pressure does not reach the pressure threshold, the processor is configured to control the internal combustion engine to increase a speed of rotation of the internal combustion engine to increase the line pressure such that the line pressure reaches the pressure threshold, and
    wherein the hydraulic circuit comprises:
        a first switching valve to apply oil pressure to the slider to move the slider to the parking release position;
        a second switching valve to apply oil pressure to the slider to move the slider to the parking lock position;
        a first oil passage connecting the first switching valve and the slider and extending to a first chamber of an actuator in which the slider is disposed;
        a second oil passage connecting the second switching valve and the slider and extending to a second chamber of the actuator;
        a third oil passage which is connected to the slider and through which a first line pressure is applied to push the slider toward the parking release position, the third oil passage extending to a third chamber of the actuator;

a fourth oil passage which is connected to the slider and through which a second line pressure is applied to push the slider toward the parking lock direction, the fourth oil passage extending to a fourth chamber of the actuator;

a common oil passage connected to the first oil passage, the second oil passage, the third oil passage, and the fourth oil passage, a line pressure being applied to the common oil passage to apply the first pressure to the third oil passage and to apply the second line pressure to the fourth oil passage; and a hydraulic cut valve provided in the third oil passage configured to be opened when the first line pressure is higher than or equal to a difference threshold that is determined based on a pressure difference between a first rising pressure and a second rising pressure, the first rising pressure being the first line pressure rising when applying the line pressure to the common oil passage is started, the second rising pressure being the second line pressure rising when applying the line pressure to the common oil passage is started, the hydraulic cut valve being configured to communicate the third oil chamber to a drain passage when the first line pressure is below the difference threshold.

5. The parking lock apparatus according to claim 4, wherein the oil pump is to discharge the operating oil by utilizing a rotation of the internal combustion engine.

6. The parking lock apparatus according to claim 4, wherein the processor is configured to determine whether the line pressure reaches the pressure threshold based on whether a speed of rotation of the internal combustion engine reaches a speed threshold.

* * * * *